April 8, 1969    M. J. P. BOGART    3,437,567
PROCESS FOR RECOVERING H₂S IN HEAVY WATER PRODUCTION
Filed Dec. 28, 1965
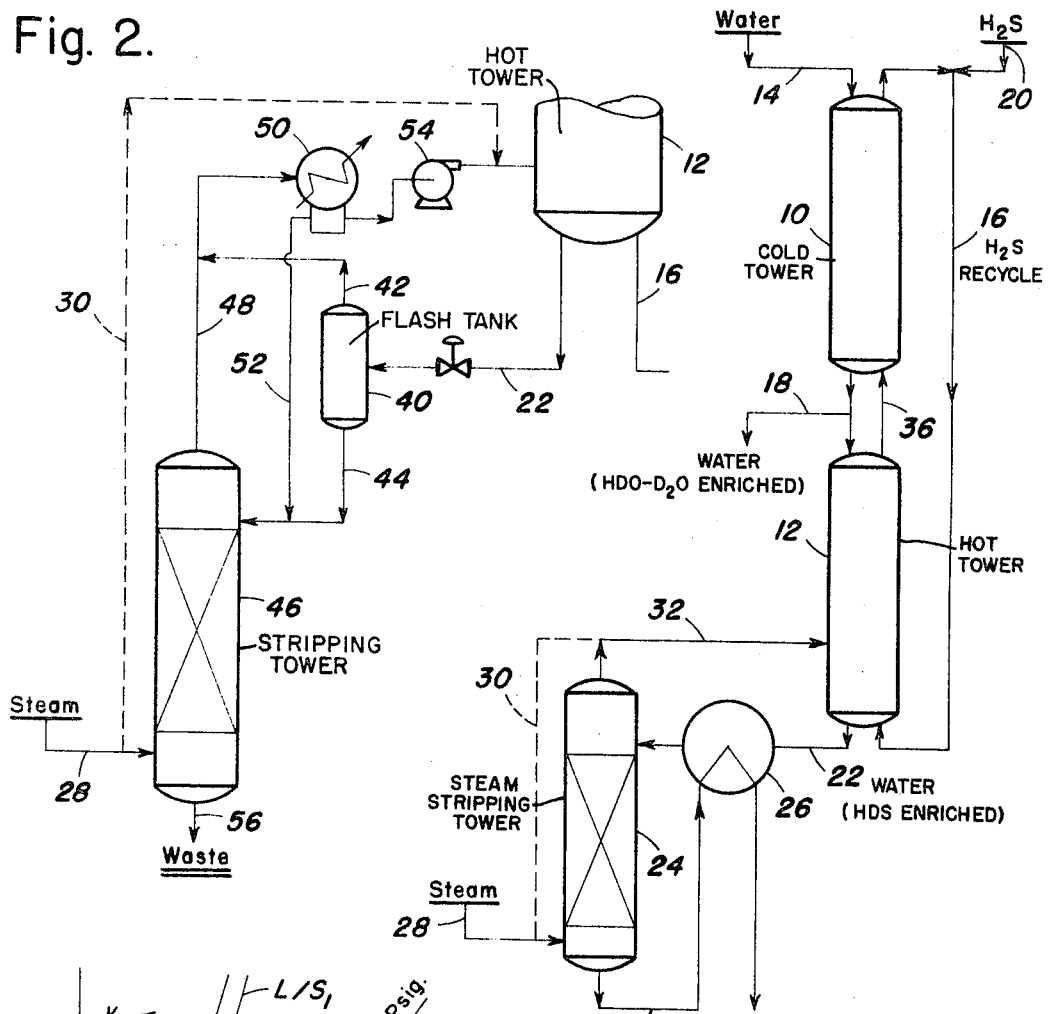
Fig. 2.
Fig. 1.
(Prior Art)
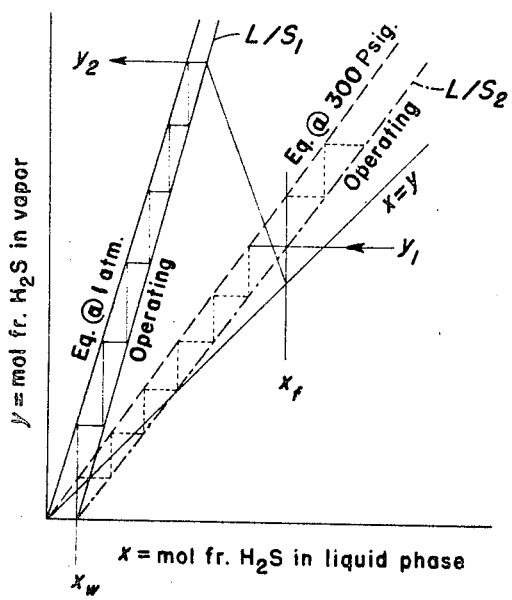
Fig. 3.
INVENTOR
Marcel J. P. Bogart
BY *Marn & Jangarathis*
ATTORNEYS

United States Patent Office 3,437,567
Patented Apr. 8, 1969

3,437,567
PROCESS FOR RECOVERING H₂S IN HEAVY WATER PRODUCTION
Marcel J. P. Bogart, London, England, assignor to The Lummus Company, Bloomfield, N.J., a corporation of Delaware
Filed Dec. 28, 1965, Ser. No. 516,842
Int. Cl. B01d *3/38, 3/06*
U.S. Cl. 203—93          6 Claims

ABSTRACT OF THE DISCLOSURE

In the concentration of HDO and D₂O in water by isotope exchange with hydrogen sulfide in cold and hot isotope exchange towers, operating at 200–300 p.s.i.g., a process for stripping hydrogen sulfide from the aqueous solution withdrawn from the hot tower wherein the pressure of the solution is reduced to near atmospheric pressure thereby producing a vapor fraction, containing hydrogen sulfide. The still liquid portion is introduced into a steam stripping tower wherein a hydrogen sulfide-containing overhead is recovered. The overhead is combined with the vapor fraction, compressed to the pressure of the exchange towers and recycled to the hot exchange tower.

---

This invention relates generally to the production of heavy water by isotope exchange between a gas and water at two different temperatures and, more particularly, the invention relates to an improved method of stripping the waste water of dissolved gas prior to discharge.

The heavier forms of water, HDO and D₂O (D being the symbol for deuterium) occur naturally in water, but only at a concentration of about $1.4 \times 10^{-4}$ mol per mol of water. Heretofore, a successful commercial process has been developed for concentrating these elements in water. This process is based on the fact that the equilibrium of exchange of the isotopes between two substances is different at different temperatures. Thus, if water containing deuterium is contacted with another hydrogen bearing substance containing deuterium at a particular temperature, there will be a definite equilibrium in the exchange in H and D atoms. As in normal chemical systems, the value of the equilibrium constant varies with temperature.

For a variety of reasons, the material of choice for contacting with the water in this process is hydrogen sulfide. The relation between the deuterium-containing molecules in this system is expressed by the reaction:

$$H_2O + HDS = HDO + H_2S$$

The equilibrium constant K is defined by the expression

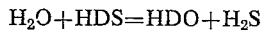

$$K = \frac{[HDO][H_2S]}{[H_2O][HDS]}$$

It has been established that the value of K decreases from 2.55 at 0° C. to 1.54 at 200° C. From this, it is concluded that in a mixture of H₂S and water, the deuterium concentrates in the water at low temperatures and in the H₂S at high temperatures.

A greatly simplified schematic drawing of a single stage of the process as it is presently practiced is illustrated in FIGURE 1. The two main exchange units are a cold tower 10 and a hot tower 12. Water 14 and H₂S 16 flow countercurrently through both towers, the fresh water entering through the top of cold tower 10. The towers are in some instances packed and in some instances tray towers, any device which promotes gas-liquid contact being suitable. Water flowing through cold tower 10 is enriched in HDO and D₂O, and a portion of this stream is withdrawn as product in line 18. The remaining water, flowing through hot tower 12, is depleted in HDO and D₂O, the counterflowing H₂S being correspondingly enriched in HDS which is exchanged back in the cold tower. The H₂S is continuously circulated via line 16. Make-up H₂S is added at 20 as required. Proper operation of the process requires that a large excess of H₂S be circulated through the system, at least 2 mols per mol of H₂O.

While the solubility of H₂S in water decreases with increasing temperature, the water removed in line 22 from the bottom of hot tower 12 contains appreciable quantities of dissolved gas. The large volumes of water and H₂S employed make it economically mandatory that this H₂S be recovered and recycled.

The recovery of H₂S is accomplished by use of a conventional stream stripper. The steam used for stripping is also used to maintain the process in heat balance, so this automatically provides for recycle of the stripped H₂S. To facilitate the injection of the steam (and H₂S) into the hot tower, the stripper is operated at the tower pressure, generally 200–300 p.s.i.g. The recovery system is thus comprised of a feed pump (not shown), a bubble-cap plate stripping tower 24 and a feed-bottoms heat exchanger 26 for recovering a portion of the sensible heat in the hot bottoms from the stripping tower. The steam 28 is supplied at at least 300 p.s.i.g., and since more steam is required for energy balance in the process than is required for stripping, a portion is passed via line 30 to stripper overhead line 32 for injection into hot tower 12. Stripper bottoms in line 34 are passed through exchanger 26, which must have a large surface area, and then to waste.

It is to be emphasized that FIGURE 1 is greatly simplified and many variations of the basic process are possible, including elaborate heat exchange of the streams passing between the towers, recovering a condensate from line 36 as product, and so forth. Further, it is necessary to carry out the process in a number of countercurrent stages to bring the deuterium content up to proper levels for further treatment.

It is a general object of the present invention to provide an improved process for H₂S recovery from water for use in a heavy water plant.

Another object of the present invention is to provide a process for removal, recovery and recycle of H₂S to the hot tower of a heavy water plant, wherein capital costs are substantially lower than in presently used processes.

Various other objects and advantages of the invention will become clear from the following discussion of an embodiment thereof, and the novel features will be particularly pointed out in connection with the appended claims. Reference will also be made to FIGURE 2, which is a simplified, schematic flow sheet illustrating an embodiment of the invention, and FIGURE 3, which is a stripping diagram of the McCabe-Thiele type.

In essence, the present invention is based on operation of the stripping tower at a substantially lower pressure than the hot and cold towers, and preferably at slightly above atmospheric pressure. The slight pressure is desirable so that the stripper bottoms can be discharged without pumping. Alternatively, the stripping tower can be operated under vacuum, which discharges the bottoms at a temperature near ambient and maximizes the heat efficiency of the process.

In accordance with the invention, and with reference to FIGURE 2, the water issuing from the hot tower in line 22 is passed to a flash tank 40, vapor flashed off in line 42 being combined directly with the stripper overhead. As this vapor contains a portion of the H₂S, load on the stripping tower is correspondingly reduced. Liquid from the flash tank is passed in line 44 to the stripping tower 46. Overhead in line 48 is partially condensed at 50, the condensate being recycled in line 52. The vapor is compressed at 54 and returned to hot tower 12. Stripper bottoms are passed directly to sewer in line 56.

The immediate advantage of operating in this manner is design and elimination of the large feed-bottoms heat exchanger (26 in FIGURE 1). Condenser 50 (FIGURE 2) is much smaller. Of course, the recovered $H_2S$ must be repressured to flow back into the hot tower, but it has been determined that this represents less than a 5% increase in the plant motive power load.

The chemical engineering design of the invention is shown graphically in FIGURE 3. The advantages of the invention can be seen clearly from FIGURE 3, which is a stripping diagram of the McCabe-Thiele type. It shows the variations of liquid and vapor composition in the $H_2S$–$H_2O$ binary system from the top tray down to the bottom tray of the stripping tower. The composition symbols of the diagram of FIGURE 3 are defined as follows:

$x_w$ = mol fraction $H_2S$ in stripper bottoms
$x_f$ = mol fraction $H_2S$ in feed (line 22)
$y_s$ = mol fraction $H_2S$ in steam = 0
$y_1$ = mol fraction $H_2S$ in vapor at 300 p.s.i.g.
$y_2$ = mol fraction $H_2S$ in vapor at 1 atm.

The heavy solid lines of FIGURE 3 show the equilibrium and operating lines for a stripping tower operating at near atmospheric pressure. The dotted lines of FIGURE 3 give the corresponding information for operation of the stripping tower at pressures substantially above atmospheric, using the same number of theoretical trays in both cases. It is well known that the slope of the operating line is given by $L/S$ where L is the molal quantity of liquid bottoms flowing per unit of time and S is the mols of stripping steam consumed in the same unit of time. Since L is not a variable in this case, it is evident that a substantially lower quantity of stripping steam is required by the lower pressure operation. Also, the $H_2S$ content of the overhead vapor ($y_2$) is higher at lowered pressures. Thus, it can be seen that stripping at or near atmospheric pressure does a better job of recovery while using less steam.

It will be understood that various changes in the details, steps, materials and arrangements of parts, which have been herein described and illustrated in order to explain the nature of the invention, may be made by those skilled in the art within the principle and scope of the invention as defined in the appended claims. For example, it will be clear that recovered $H_2S$ can be returned to the process at any convenient point, or can be stored prior to such recycle.

What is claimed is:
1. Process for stripping hydrogen sulfide from an aqueous solution produced in an isotope-exchange tower under substantial pressure comprising:
reducing the pressure of said solution to near atmospheric pressure by passing the solution to a flash zone and recovering a first vapor fraction;
passing said solution from the flash zone at said reduced pressure to a stripping zone and stripping said hydrogen sulfide therefrom with high-pressure steam;
recovering said steam with said hydrogen sulfide as a second vapor fraction; and
combining said first and second vapor fractions and compressing same to the pressure of said isotope exchange tower for recycle of said hydrogen sulfide.

2. The process as claimed in claim 1, and additionally comprising partially condensing said combined vapor fractions and recycling the condensate thus produced to said stripping zone.

3. In a process for concentrating HDO and $D_2O$ in water by isotope exchange with hydrogen sulfide in cold and hot isotope exchange towers at a pressure in the range of about 200–300 p.s.i.g., the improvements comprising:
removing water containing hydrogen sulfide from the bottom of said hot tower;
passing said water to a flash zone wherein the pressure is reduced to near atmospheric and a first vapor fraction is produced;
passing said water to a stripping zone operated at near atmospheric pressure and stripping said hydrogen sulfide from said water with steam;
recovering a second vapor fraction and water essentially free of hydrogen sulfide from said stripping zone; and
combining said first and second vapor fractions, and compressing the same to the pressure of said isotope exchange towers for reuse therein.

4. The process as claimed in claim 3, and additionally comprising condensing a portion of said combined vapor fractions prior to compression thereof, and returning the condensate thus produced to said stripping zone.

5. The process as claimed in claim 1, wherein the pressure of the solution in the flash zone is reduced to below atmospheric pressure.

6. The process as claimed in claim 3, wherein the pressure of the water in the flash zone is reduced to below atmospheric pressure.

References Cited
UNITED STATES PATENTS

| | | | |
|---|---|---|---|
| 2,741,543 | 4/1956 | Urey | 23—204 |
| 2,787,526 | 4/1957 | Spevack | 23—204 |
| 2,895,803 | 7/1959 | Spevack | 23—204 |
| 3,007,777 | 11/1961 | Perret et al. | 23—204 |

FOREIGN PATENTS

| | | |
|---|---|---|
| 1,138,776 | 6/1957 | France. |
| 576,237 | 4/1958 | Italy. |

NORMAN YUDKOFF, *Primary Examiner.*

F. E. DRUMMOND, *Assistant Examiner.*

U.S. Cl. X.R.

203—97, 88, 206; 23—204, 206, 312

U.S. DEPARTMENT OF COMMERCE

PATENT OFFICE

Washington, D.C. 20231

UNITED STATES PATENT OFFICE
CERTIFICATE OF CORRECTION

Patent No. 3,437,567            April 8, 196

Marcel J. P. Bogart

It is certified that error appears in the above identified patent and that said Letters Patent are hereby corrected as shown below:

Column 3, between lines 5 and 6 insert -- the lowered capital cost resulting from ambient pressure --.

Signed and sealed this 14th day of April 1970.

(SEAL)
Attest:

Edward M. Fletcher, Jr.            WILLIAM E. SCHUYLER, JR

Attesting Officer            Commissioner of Patents